(12) United States Patent
Kim et al.

(10) Patent No.: US 9,880,882 B2
(45) Date of Patent: Jan. 30, 2018

(54) MULTI-TENANT SAAS PLATFORM AND METHOD FOR AUTOMATED DEPLOYMENT OF CONNECTOR APPLICATION, AND TENANT AND SERVICE PROVIDER USING VIRTUAL MACHINE

(71) Applicant: SAMSUNG SDS CO., LTD., Seoul (KR)

(72) Inventors: Jik Soo Kim, Yongin-si (KR); Nam Kyung Kim, Seoul (KR); Hyung Won Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 679 days.

(21) Appl. No.: 14/522,733

(22) Filed: Oct. 24, 2014

(65) Prior Publication Data

US 2015/0120818 A1      Apr. 30, 2015

(30) Foreign Application Priority Data

Oct. 24, 2013   (KR) .................. 10-2013-0127025

(51) Int. Cl.
*G06F 9/50*        (2006.01)
*G06F 9/455*       (2006.01)
(Continued)

(52) U.S. Cl.
CPC ........ *G06F 9/5072* (2013.01); *G06F 9/45558* (2013.01); *G06F 21/00* (2013.01);
(Continued)

(58) Field of Classification Search
CPC ... G06F 2009/45562; G06F 2009/4557; G06F 21/00; G06F 9/45533; G06F 9/45558;
(Continued)

(56) References Cited

U.S. PATENT DOCUMENTS 8,291,490 B1 * 10/2012 Ahmed ................. G06F 21/604
                                                  726/17
8,326,876 B1 * 12/2012 Venkataraman .... G06F 17/3056
                                                  707/759

(Continued)

*Primary Examiner* — Backhean Tiv
(74) *Attorney, Agent, or Firm* — Sughrue Mion, PLLC

(57) ABSTRACT

A multi-tenant software as a service (SaaS) platform for automatic deployment of a connector application, and a method for automatic deployment of a connector application in a multi-tenant software as a service (SaaS) platform, the method including: deploying a tenant service connector package to a tenant among a plurality of tenants, the tenant service connector package being a package configured to cause a tenant virtual machine to be created in order to provide a service to at least one tenant of the plurality of tenants in a virtual machine form; activating the tenant virtual machine through execution of the tenant service connector package in the tenant that receives the tenant service connector package; forming a connection channel between a virtual machine of the SaaS platform and the tenant virtual machine; and providing the service between the SaaS platform and the at least one tenant through the formed connection channel.

15 Claims, 9 Drawing Sheets

(51) Int. Cl.
*G06F 21/00* (2013.01)
*H04L 12/24* (2006.01)

(52) U.S. Cl.
CPC ........... *G06F 2009/4557* (2013.01); *G06F 2009/45562* (2013.01); *H04L 41/5096* (2013.01)

(58) Field of Classification Search
CPC ............ G06F 9/5072; H04L 41/0806; H04L 41/5096; H04L 67/10; H04L 67/16
See application file for complete search history.

(56) References Cited

U.S. PATENT DOCUMENTS

| | | | | |
|---|---|---|---|---|
| 9,043,456 B2* | 5/2015 | Kuramoto | G06F 17/30595 | 709/219 |
| 9,043,458 B2* | 5/2015 | Balaji | H04L 43/04 | 709/217 |
| 2005/0163136 A1* | 7/2005 | Chiu | H04L 67/02 | 370/401 |
| 2009/0271472 A1* | 10/2009 | Scheifler | G06F 9/485 | 709/202 |
| 2010/0005443 A1* | 1/2010 | Kwok | G06Q 10/10 | 717/100 |
| 2010/0077449 A1* | 3/2010 | Kwok | G06F 9/5027 | 726/3 |
| 2011/0125894 A1* | 5/2011 | Anderson | H04L 9/3213 | 709/224 |
| 2011/0213870 A1* | 9/2011 | Cai | H04L 67/10 | 709/223 |
| 2011/0271278 A1* | 11/2011 | Dittrich | G06F 8/60 | 718/1 |
| 2011/0307889 A1* | 12/2011 | Moriki | G06F 9/45558 | 718/1 |
| 2012/0159423 A1* | 6/2012 | Becker | G06F 9/44526 | 717/102 |
| 2013/0218731 A1* | 8/2013 | Elson | G06F 15/16 | 705/30 |
| 2013/0311631 A1* | 11/2013 | Koo | G06F 9/5072 | 709/223 |
| 2014/0006580 A1* | 1/2014 | Raghu | G06F 9/5072 | 709/223 |
| 2014/0040473 A1* | 2/2014 | Ho | G06F 9/5072 | 709/226 |
| 2014/0280948 A1* | 9/2014 | Schmidt | H04L 47/827 | 709/226 |
| 2014/0289391 A1* | 9/2014 | Balaji | H04L 43/04 | 709/224 |
| 2014/0359610 A1* | 12/2014 | Tian | G06F 9/45558 | 718/1 |
| 2015/0039891 A1* | 2/2015 | Ignatchenko | G06F 21/575 | 713/171 |
| 2015/0120818 A1* | 4/2015 | Kim | G06F 9/45558 | 709/203 |
| 2016/0205007 A1* | 7/2016 | Syed | H04L 43/062 | 709/224 |
| 2017/0109193 A1* | 4/2017 | Tian | G06F 9/45558 | |

* cited by examiner

[fig 1]
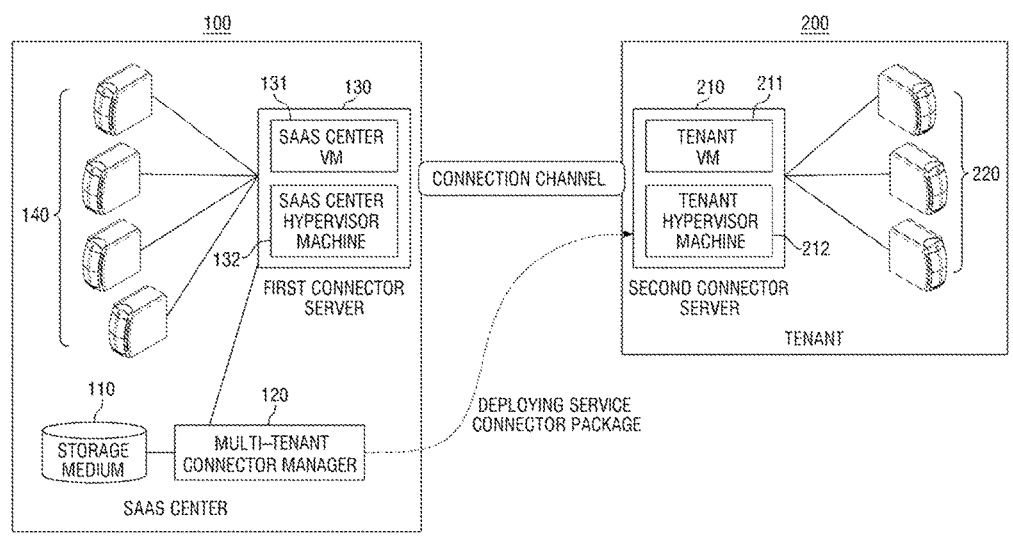

[fig 2]
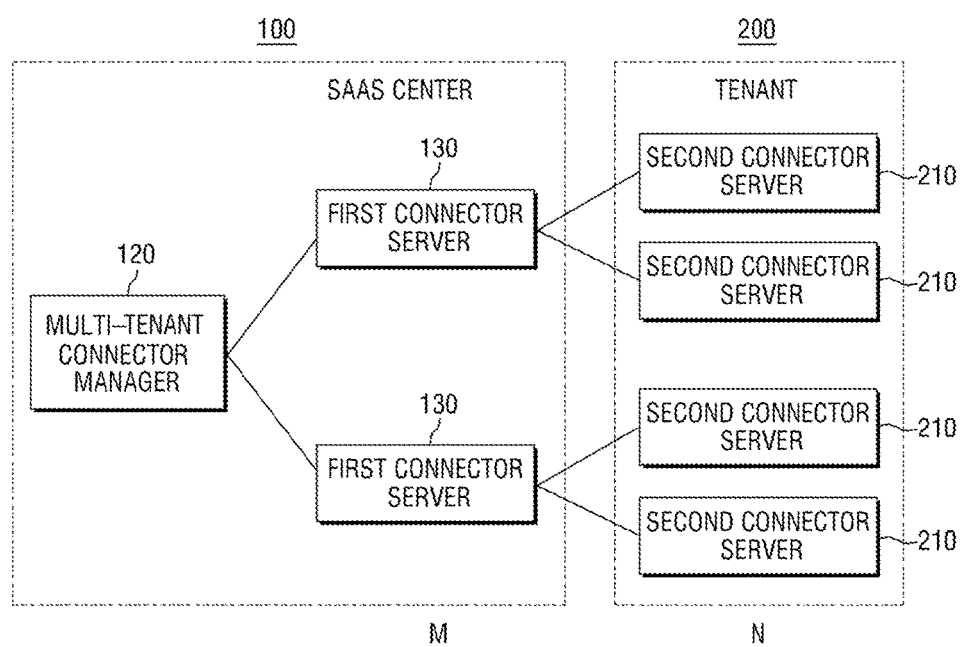

[fig 3]
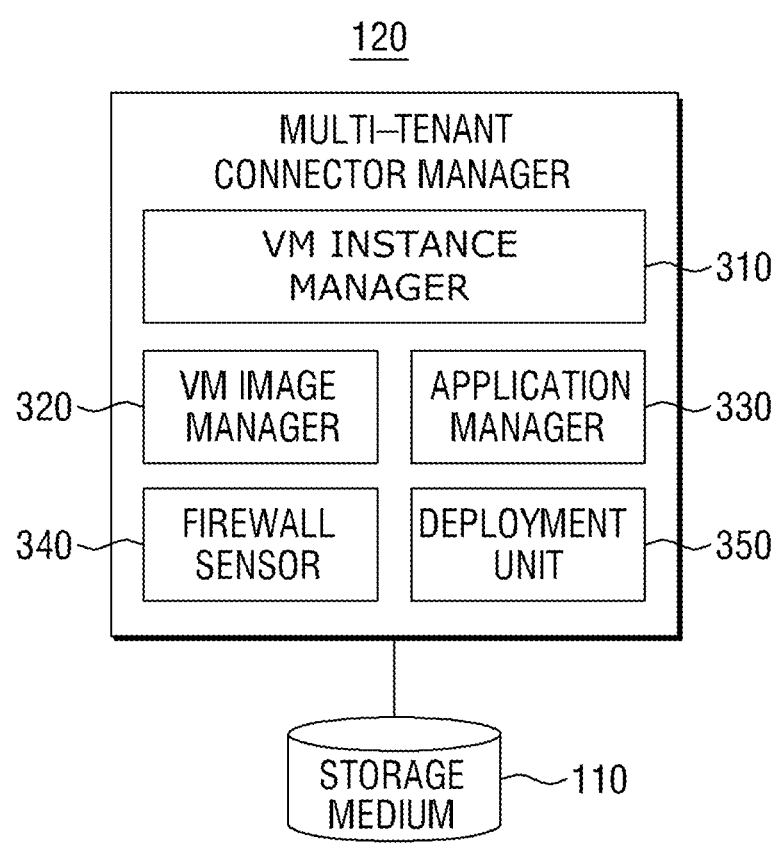

[fig 4a]
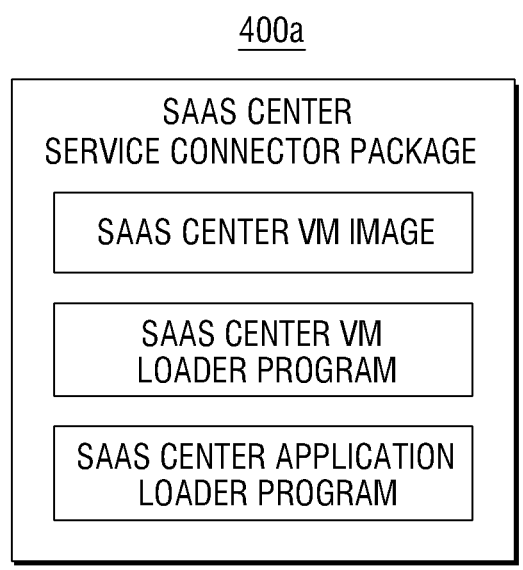

[fig 4b]
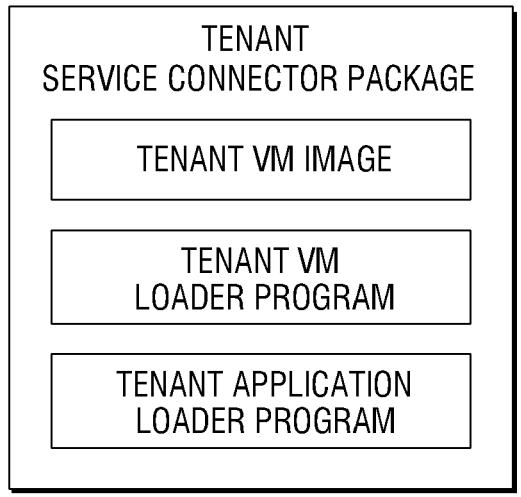
[fig 4c]
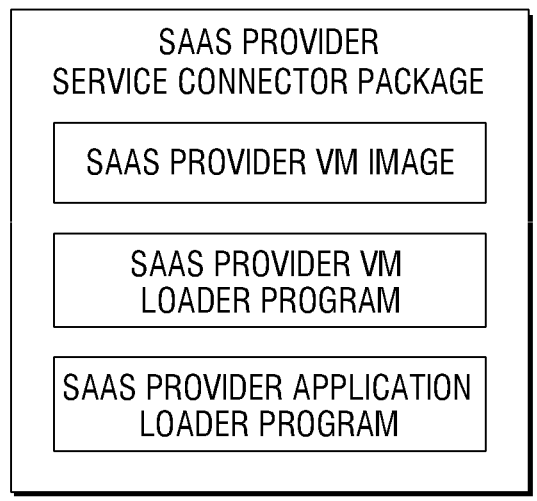

[fig 5]
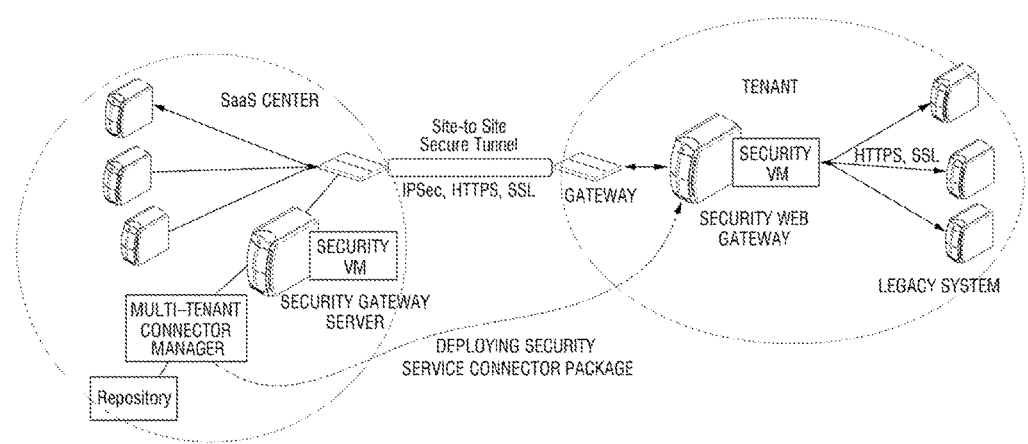

[fig 6]
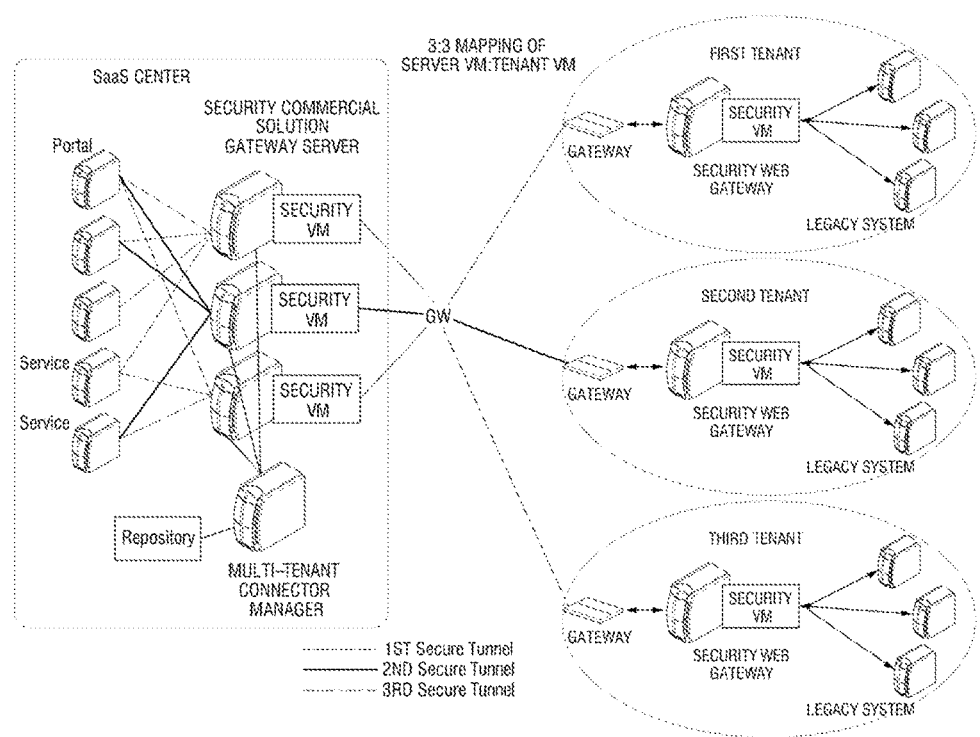

[fig 7]
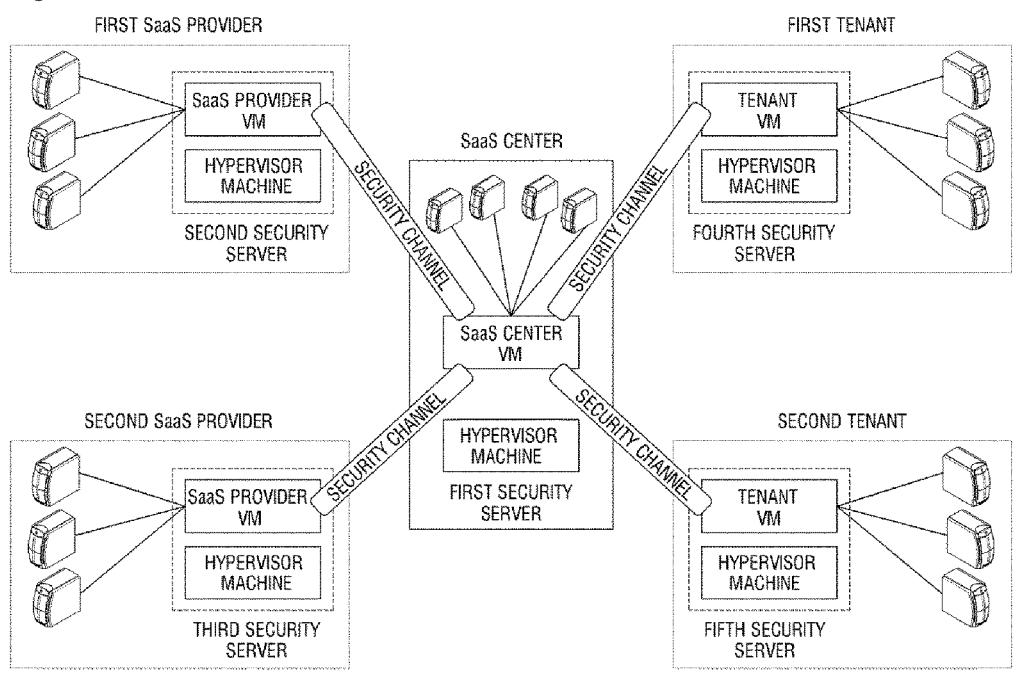

[fig 8]
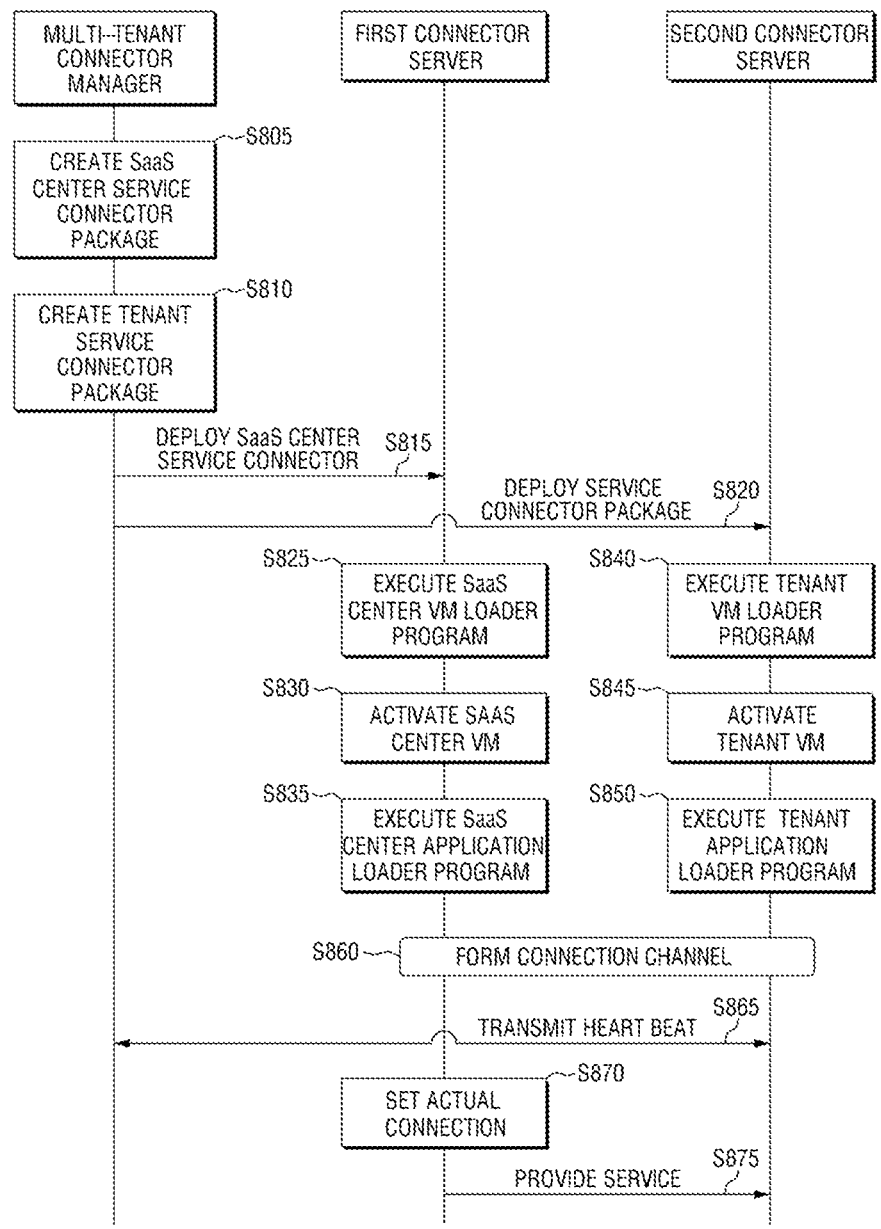

MULTI-TENANT SAAS PLATFORM AND METHOD FOR AUTOMATED DEPLOYMENT OF CONNECTOR APPLICATION, AND TENANT AND SERVICE PROVIDER USING VIRTUAL MACHINE

CROSS-REFERENCE TO RELATED APPLICATION

This application claims priority from Korean Patent Application No. 10-2013-0127025 filed on Oct. 24, 2013 in the Korean Intellectual Property Office, and all the benefits accruing therefrom under 35 U.S.C. 119, the contents of which in its entirety are herein incorporated by reference.

TECHNICAL FIELD

The present invention relates to a multi-tenant SaaS platform and a method for automated deployment of a connector application, and a tenant and a service provider using a virtual machine, and more particularly, to a multi-tenant SaaS platform and a method for automated deployment of a connector application for automatically deploying of a virtual machine for more efficiently providing a cloud service, and a tenant and a service provider using the virtual machine.

BACKGROUND

A software as a service (SaaS) system represents a type that does not have software installed in a computer thereof and receives a software service through the Internet. One of largest features of a SaaS is supporting multiple tenants as compared with the existing installation type software. Supporting the multiple tenants represents that one virtual machine instance supports a service to a plurality of tenants.

Meanwhile, as a SaaS based cloud service is generalized, introduction of the cloud service of an enterprise is actualized, but various efforts for improving the quality of the cloud service are required. For example, when a SaaS provider provides a specialized service to a tenant, since a separate device (appliance) needs to be installed for each tenant in the related art, such inconvenience needs to be solved. Further, in order to solve a problem which occurs as a plurality of SaaS providers provides the service to respective tenants, a proposal of a cloud services brokerage model gathering services provided by the plurality of SaaS providers and providing the gathered services to the tenant is also required.

SUMMARY

The present invention has been made in an effort to provide a multi-tenant SaaS platform and a method for automated deployment of a connector application, which can improve the quality of a SaaS service by automatically deploying connector applications configured so that a service is deployed in a virtual machine form, that is, a service connector package to a tenant and managing the service connector package, without directly installing a separate device in the tenant, and a tenant and a service provider using a virtual machine.

According to embodiments of the present invention, a SaaS center and a tenant or a service provider are connected with each other through a service connector package deployed by the SaaS center without installing a separate device (appliance) in the tenant or the service provider and a cloud service can be provided to the tenant through the connection. As a result, a concern about an unstable factor such as a security problem of the cloud service can be solved and the quality of the cloud service can be improved.

A service for improving the quality of the cloud service provided by the SaaS center is efficiently deployed to increase efficiency in terms of time-to-market and consequently, a higher level of service level agreement (SLA) can be guaranteed.

Since the tenant can easily add services such as a virtual private network (VPN) security channel, a wide area network (WAN) acceleration, and the like by using a virtual machine generated through the service connector package, a higher-quality service can be provided to the tenant.

BRIEF DESCRIPTION OF THE DRAWINGS

The above and other features and advantages of the present invention will become more apparent by describing in detail embodiments thereof with reference to the attached drawings in which:

FIG. 1 is a diagram illustrating a system including a SaaS center and a tenant according to an embodiment of the present invention;

FIG. 2 is a diagram illustrating one example in which tenant virtual machines and SaaS center virtual machines are mapped in an M:N pattern;

FIG. 3 is a block diagram illustrating a multi-tenant connector manager according to the embodiment of the present invention;

FIG. 4A is a configuration diagram of a SaaS center service connector package deployed in the SaaS center according to the embodiment of the present invention;

FIG. 4B is a configuration diagram of a tenant service connector package deployed to the tenant according to the embodiment of the present invention;

FIG. 4C is a configuration diagram of a SaaS provider service connector package deployed to a SaaS provider according to the embodiment of the present invention;

FIG. 5 is a diagram for describing security services of a SaaS center virtual machine and a tenant virtual machine which are mapped in a 1:1 pattern;

FIG. 6 is a diagram for describing security services of the SaaS centers VM and the tenants VM which are mapped in a 3:3 pattern;

FIG. 7 is a diagram for describing an embodiment in which the SaaS center operates as a SaaS hub platform; and FIG. 8 is a flowchart for describing a method for providing a service of a SaaS center to a tenant according to another embodiment of the present invention.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

First, in describing the embodiments, a term "multi-tenant SaaS hub platform" is used as a meaning of a platform that serves as a hub that is connected with a service provider providing a service to provide the service from the service provider to at least one tenant.

A term "SaaS center" is used as the same meaning as the multi-tenant SaaS (hub) platform".

Terms "tenant and SaaS provider" mean destinations to which the SaaS center deploys a service connector package for the service.

The service provider is the SaaS provider that provides a cloud service to be provided to the tenant to the SaaS center by using a SaaS type.

The term "service connector package" which is used for activating a virtual machine required for providing the service in the SaaS center is called a "tenant service connector package", a "SaaS provider service connector package", or a "SaaS center service connector package" according to the destination to which the "service connector package".

In the patent, the "tenant service connector package" deployed to the tenant is primarily described and described contents are similarly applied to even the SaaS provider and the SaaS center and a detailed description of the SaaS provider is omitted.

The "SaaS center service connector package" as a package which a multi-tenant connector package deploys to a first connector server of the SaaS center is used as the same meaning as a "package for multi-tenant SaaS (hub) platform".

The "SaaS type" has a service concept that enables only a service required by a user to be used among services provided by various software. In the SaaS type, the service provider may provide a software service to a plurality of tenants by using one or more platforms and each tenant may pay fees for a used service.

"Multi-tenancy" means that multi-tenants share the service, based on virtualization technology and the same infrastructure under a computing environment.

The "multi-tenants" mean a plurality of tenants and one tenant as one group using the service may be, for example one enterprise. Accordingly, a plurality of users is included in one tenant.

FIG. 1 is a diagram illustrating a system including a SaaS center 100 and a tenant 200 that provide a service according to an embodiment of the present invention.

The SaaS center 100 illustrated in FIG. 1 as a multi-tenant SaaS hub platform may deploy a tenant service connector package for a cloud service (hereinafter, referred to as a "service") in order to provide a higher-quality cloud service to at least one tenant 200. When a tenant virtual machine (VM) is executed and activated in the tenant through a tenant virtual machine loader program in the tenant service connector package, the SaaS center 100 provides the service, and monitors a VM state of the tenant and a connection state with the SaaS center 100 through a VM instance.

When the SaaS center 100 is connected with even a SaaS provider to serve to deploy a SaaS provider service connector package to the SaaS provider and transfer a service provided from a service provider to at least one tenant, the SaaS center 100 may serve as the multi-tenant SaaS hub platform.

In FIG. 1, the tenant 200 of the SaaS provider and the tenant 200 will be primarily described and the description applied to FIG. 1 is applied similarly to the SaaS provider, and as a result, a description thereof will be omitted as described above.

One tenant 200 is illustrated in FIG. 1 for easy description, but the present invention is not limited thereto. That is, the SaaS center 100 and the tenant 200 are connected to each other one to one in FIG. 1, but when the number of tenants 200 increases, or the number of connector servers in the tenant 200 increases, the number of tenants connected with a SaaS center VM of the SaaS center 100 increases. Therefore, when the increased number of tenants 200 exceeds a specification supported by a hardware device of the SaaS center 100, the number of SaaS center VMs may increase.

That is, the system of FIG. 1 shows a form in which the SaaS center 100 and the tenant 200 are mapped to each other one to one, but when the number of tenant VMs increases, the SaaS center 100 and the tenants 200 are mapped to each other 1 to N and when the number of SaaS center VMs increases, the SaaS centers 100 and the tenant 200 are mapped to each other M to 1. Further, both the number of tenants VMs and the number of SaaS centers VMs increase, the tenants VMs and the SaaS centers VMs may be mapped to each other M to N as illustrated in FIG. 2. FIG. 2 is a diagram illustrating one example in which tenant VMs and a SaaS center VMs are mapped to each other M to N.

Since first connector servers 130 illustrated in FIG. 2 as different servers are installed in the SaaS center 100, the same reference numeral refers to the first connector servers 130. Further, since even second connector servers 210 as different servers are also installed in the tenant 200, the same reference numeral refers to the second connector servers 210.

The SaaS center VM is installed in the first connector server 130 and the tenant VM is installed in the second connector server 210. Accordingly, the SaaS center VMs and the tenant VMs may be installed and connected in an M:N mapping form. In this case, a multi-tenant connector manager 120 is installed in a server apart from the first connector server 130, and deploys a SaaS center service connector package illustrated in FIG. 4A to the first connector server 130 and deploys a tenant service connector package illustrated in FIG. 4B to the second connector server 210.

Meanwhile, servers 140 connected with the first connector server 130 in the SaaS center 100 are servers and DB devices that perform functions provided by a platform of the SaaS center 100. Further, servers 220 connected with the second connector server 210 in the tenant 200 may be a server that performs a service used in the tenant 200 or a server and DB device that contain information required for using a cloud service. In addition, when the SaaS center 100 servers as the SaaS hub platform, a SaaS service provider which is not illustrated may be a server and DB device for providing respective sharing services.

Hereinafter, an operation between the SaaS center 100 and the tenant 200 will be described with reference to FIGS. 1 to 4B.

Referring to FIG. 1, the SaaS center 100 includes a storage medium 110, a multi-tenant connector manager 120 and a first connector server 130.

The storage medium 110 as a large-capacity storage medium stores a SaaS center VM image, a SaaS center VM loader program, and a SaaS center application loader program to be deployed to the first connector server 130 and may variously store the SaaS center VM image, the SaaS center VM loader program, and the SaaS center application loader program according to a service or a type of the SaaS center VM image. The SaaS center VM image, the SaaS center VM loader program, and the SaaS center application loader program to be deployed will be described in detail with reference to FIG. 4A.

The storage medium 110 stores a tenant VM image, a tenant VM loader program, and a tenant application loader program to be deployed to a tenant. The tenant VM image, the tenant VM loader program, and the tenant application loader program will be described in detail with reference to FIG. 4B. The storage medium 110 may store various tenant VM images, tenant VM loader programs, and tenant application loader programs according to a type of the tenant VM image or a service provided by the SaaS center 100.

The storage medium 110 stores a SaaS provider VM image, a SaaS provider VM loader program, and a SaaS provider application loader program to be deployed to a SaaS provider. The SaaS provider VM image, the SaaS provider VM loader program, and the SaaS provider application loader program will be described in detail with reference to FIG. 4C.

The multi-tenant connector manager 120 automatically creates a SaaS center service connector package, a tenant service connector package, and a SaaS provider service connector package to automatically deploy the created SaaS center service connector package, tenant service connector package, and SaaS provider service connector package to the first connector server 130, the tenant 200, and a SaaS provider (not illustrated), respectively. As one example, the tenant service connector package is used to create a tenant VM in the tenant 200 in order to provide the service to the tenant 200 in a VM form.

When the tenant service connector package is executed in the tenant 200, and as a result, the tenant VM is activated (that is, when a VM image is VM-instanced), the first connector server 130 forms a connection channel with the activated tenant VM. The service is provided between the SaaS center 100 and the tenant 200 through the formed connection channel.

FIG. 3 is a block diagram illustrating a multi-tenant connector manager 120 according to an embodiment of the present invention.

Referring to FIG. 3, the multi-tenant connector manager 120 includes a VM instance manager 310, a VM image manager 320, an application manager 330, a firewall sensor 340, and a deployment unit 350.

The VM instance manager 310 requests the tenant VM image corresponding to the service to be provided to the tenant 200 and set-up files for executing the tenant VM image to the VM image manager 320 and the application manager 330. When an automatic deployment command of a tenant service connector package 400b is input from a manager of the SaaS center 100, the VM instance manager 310 may request the automatic deployment of the tenant service connector package 400b to the VM image manager 320 and the application manager 330.

In detail, the set-up files for executing the tenant VM image include the tenant VM loader program for loading the tenant VM image and the tenant application loader program for loading the application associated with the service. The VM instance manager 310 requests the tenant VM image and the tenant VM loader program to the VM image manager 320 and requests the tenant application loader program to the application manager 330.

The VM instance manager 310 combines the tenant VM image, the tenant VM loader program, and the tenant application loader program transferred from the VM image manager 320 and the application manager 330 to create the tenant service connector package 400b to be deployed to the tenant 200 as illustrated in FIG. 4B.

The VM instance manager 310 requests the SaaS center VM image and the SaaS center VM loader program to the VM image manager 320 and requests the SaaS center application loader program to the application manager 330, in order to create the SaaS center service connector package 400a. In addition, the VM instance manager 310 combines the received SaaS center VM image, the SaaS center VM loader program, and the SaaS center application loader program to create the SaaS center service connector package 400a. The SaaS center service connector package 400a is used to activate a SaaS center VM 131 and manages the SaaS center VM 130.

The VM instance manager 310 requests the SaaS provider VM image and the SaaS provider VM loader program to the VM image manager 320 and requests the SaaS provider application loader program to the application manager 330, in order to create a SaaS provider service connector package 400c. In addition, the VM instance manager 310 combines the received SaaS provider VM image, the SaaS provider VM loader program, and the SaaS provider application loader program to create the SaaS provider service connector package 400c. The SaaS provider service connector package 400c is used to activate the SaaS provider VM 131 and manages a SaaS provider VM (not illustrated).

The VM image manager 320 reads a program (hereinafter, referred to as a 'VM loader program') for loading the VM image and the VM image among the set-up files, from the storage medium 110 to transfer the read VM loader program and VM image to the VM instance manager 310, according to the request by the VM instance manager 310. The "VM image" means the tenant VM image, the SaaS provider VM image, or the SaaS center VM image and the "VM loader program" means the tenant VM loader program, the SaaS provider VM loader program, or the SaaS center VM loader program.

The VM image manager 320 stores and manages a new VM image or VM loader program in the storage medium 110. For example, the VM image manager 320 stores and manages pre-configured VM images to which a frequently used set-up is previously applied and stores and manages VM images to which a new set-up is applied. The 'frequently used set-up' means presetting an option of a menu commonly frequently used in various menus to be set when the tenant VM is activated.

When automatic execution is set up as the 'frequently used set-up', the tenant VM loader program is automatically executed in the second connector server 210 at a set time. Alternatively, when manual execution is set up as the 'frequently used set-up', the tenant VM loader program is manually executed in the second connector server 210 by a manager of the tenant 200.

The application manager 330 reads a program (hereinafter, referred to as an 'application loader program') for loading the application associated with the service among the set-up files from the storage medium 110 to transfer the read application loader program to the VM instance manager 310, according to the request by the VM instance manager 310. Further, the application manager 330 stores and manages a new application loader program in the storage medium 110. The application loader program means the tenant application loader program, the SaaS center application loader program, or the SaaS provider application.

The application manager 330 stores and manages various set-up information including network configuration information of the tenant 200 and information for clustering the tenant VM instance and program related information in the storage medium 110. The network configuration information as information which the tenant 200 notifies to the manager of the SaaS center 100 before deploying the service connector packages 400a and 400b includes, for example, an Internet protocol (IP) address used by the second connector server 210.

The tenant VM instance means a state in which the tenant VM image is activated by the tenant VM loader program and the clustering means high availability to be described below.

The firewall sensor 340 senses whether a firewall of the tenant 200 is opened when the VM instance manager 310 creates the tenant service connector package 400b and the SaaS center service connector package 400a or periodically. When the firewall of the tenant 200 is not opened, the firewall sensor 340 notifies that the firewall is not opened to the manager and the manager may request the opening of the firewall to the manager of the tenant 200.

When the firewall of the tenant 200 is opened, the deployment unit 350 deploys the tenant service connector package 400b to the tenant 200 from the VM instance manager 310 and deploys the SaaS center service connector package 400a to the first connector server 130. That is, the deployment unit 350 may deploy the tenant service connector package 400b to the second connector server 210 by using the network configuration information of the tenant 200.

When images or files included in the tenant service connector package 400b to be deployed to the tenant 200 are updated, the VM instance manager 310 creates an updated tenant service connector package and the deployment unit 350 redeploys the updated tenant service connector package to the second connector server 210.

The deployment unit 350 may deploy a plurality of tenant service connector packages 400b to the tenant 200 for high availability of the service. In this case, the tenant 200 may activate the tenant VM by using a remaining tenant service connector package when a problem occurs in a firstly executed tenant VM. That is, the plurality of service connector packages may be used as a back-up concept in the tenant 200.

Meanwhile, the first connector server 130 receives the SaaS center service connector package 400a from the deployment unit 350. The SaaS center service connector package 400a includes the SaaS center VM image, the SaaS center VM loader program, and the SaaS center application loader program as illustrated in FIG. 4A.

When the SaaS center service connector package 400a reaches the first connector server 130, the SaaS center VM image is loaded while the SaaS center VM loader program is executed. Therefore, the SaaS center VM image is instanced, and as a result, the SaaS center VM 131 is activated. Thereafter, when a tenant VM 211 is also activated and the SaaS center application loader program is executed, the connection channel is formed between the SaaS center VM 131 and the tenant VM 211.

The connection channel is used when the SaaS center 100 provides the service to the tenant VM 211 through the SaaS center VM 131 or manages a state of the tenant 200. An SaaS center hypervisor machine 132 is used for operating the SaaS center VM 131 and the SaaS center VM 131 is subordinately driven on the SaaS center hypervisor machine 132.

Meanwhile, the tenant 200 receives the tenant service connector package 400b deployed from the multi-tenant connector manager 120 of the SaaS center 100. The received tenant service connector package 400b includes the tenant VM image, the tenant VM loader program, and the tenant application loader program as illustrated in FIG. 4B.

When the tenant service connector package 400b reaches the tenant 200, the tenant VM image is loaded while the tenant VM loader program is executed. Therefore, the tenant VM image is instanced, and as a result, the tenant VM 211 is activated. When the automatic execution is set up for the tenant VM loader program, the tenant VM loader program is automatically executed at a set time. Alternatively, when the manual execution is set up for the tenant VM loader program, the tenant VM loader program is manually executed by an operation by the manager.

Thereafter, when the SaaS center VM 131 is also activated and the tenant application loader program is executed, the connection channel is formed between the SaaS center VM 131 and the tenant VM 211.

A tenant hypervisor machine 212 is used for operating the tenant VM 211 and the tenant VM 211 is subordinately driven on the tenant hypervisor machine 212.

FIG. 4A is a configuration diagram of a SaaS center service connector package deployed in the SaaS center 100 according to the embodiment of the present invention, FIG. 4B is a configuration diagram of a tenant service connector package 400b deployed to the tenant 200 according to the embodiment of the present invention, and FIG. 4C is a configuration diagram of a SaaS provider service connector package 400c deployed to a SaaS provider according to the embodiment of the present invention.

Since configurations of the respective packages 400a, 400b, and 400c illustrated in FIGS. 4A to 4C are similar to each other, the tenant service connector package 400b for executing the tenant VM will be described below in detail with reference to FIG. 4B.

The tenant VM image includes an operating system (OS), an application, and application dependent libraries, and the tenant VM image is the pre-configured VM image and a VM instance is created through the tenant VM image. The VM instance means an actual tenant VM in which the VM image is activated. The application is an application for a service which the tenant VM 211 actually provides and the application dependent libraries as a library required for driving the application may include, for example, Java.

The tenant VM loader program includes a configuration script for creating the VM instance and also includes a function to support various types of hypervisors (for example, VMware, Xen, KVM, and the like).

After the tenant VM loader program is executed, the tenant application loader program is executed, and as a result, the application included in the tenant service connector package 400b is executed and the connection channel is formed between the SaaS center 100 and the tenant 200. The tenant hypervisor machine 212 needs to be installed in the tenant 200 in order to install and execute the tenant VM 211 and in the first connector server 130 of the SaaS center 100, the application included in the SaaS center connector package 400a needs to be, of course, executed by the same process as that of the tenant service connector package 400b.

FIG. 5 is a diagram for describing security services of the SaaS center VM and the tenant VM which are mapped in a 1:1 pattern.

A security gateway server illustrated in FIG. 5 is the first connector server 130 of FIG. 1, the multi-tenant connector manager is the multi-tenant connector manager 120, a repository is the storage medium 110 of FIG. 1, the SaaS center is the SaaS center 100 of FIG. 1, the tenant is the tenant 200 of FIG. 1, and a security web gateway is the second connector server 210 of FIG. 1.

Referring to FIG. 5, the SaaS center may provide an end-to-end security service of the tenant and the SaaS center. To this end, the multi-tenant connector manager creates a security service connector page to deploy the created security service connector package to a security web gateway of the tenant and a security gateway server of the SaaS center. Program contents constituting the security service connector package deployed to a security web gateway of the tenant and a security gateway server of the SaaS center may be partially different. For example, the security service connector package deployed to the security gateway server may further include a function for managing a security VM activated in the security web gateway of the tenant.

The security service connector package is constituted by the VM image and the executed files as illustrated in FIG. 4A or 4B and is automatically or manually executed in the tenant and the SaaS center, and as a result, the security VM is activated in the tenant and the SaaS center.

When the security VM is activated in the tenant and the SaaS center, a site-to-site secure tunnel (that is, the connection channel of FIG. 1) is formed between terminals of the security gateway server and the security web gateway.

The SaaS center illustrated in FIG. 5 may set a security solution VM (that is, security VM) by using the security service connector package, deploy the security solution VM to the tenant, and remotely manage the tenant by using the security VM and the site-to-site secure tunnel.

The security gateway server in which the security VM is activated may also serve as a commercial security gateway (GW) in the SaaS center.

The tenant in which the security VM is activated may also serve as a server for strengthening the security through the security VM as well as a general gateway.

A legacy system of the tenant means an entire enterprise system in which information and functions which are added or changed continuously from the past through an additional development or enhancement task, or the like after the system is first developed in a platform of the tenant are included and accumulated. Most enterprises that provide the service to general customers by using a computer have both an application program group and a database or a data mart in which data have already been accumulated while enhancing or changing a function to process an important business.

FIG. 6 is a diagram for describing security services of the SaaS centers VMs and the tenants VMs which are mapped in a 3:3 pattern.

A plurality of security gateway servers illustrated in FIG. 6 is the plurality of first connector servers 130, the multi-tenant connector manager is the multi-tenant connector manager 120 of FIG. 1, a repository is the storage medium 110 of FIG. 1, the SaaS center is the SaaS center 100 of FIG. 1, first to third tenants are the plurality of tenants 200, and the security web gateway is the plurality of second connector servers 210.

Operations of the SaaS center and the first to third tenants illustrated in FIG. 6 are substantially the same as the operations of the SaaS center and the tenant illustrated in FIG. 5. However, a plurality of security commercial solution gateway servers is provided in FIG. 6 and each of the plurality of security commercial solution gateway servers is connected with one of the first to third tenants. In this case, the security commercial solution gateway servers are connected with the tenant in which respective connection channels (secure channels) are formed by using respective security VMs. That is, since the first to third secure tunnels are formed in FIG. 6, the first to third tenants provide the security service by using the corresponding connection channels.

FIG. 7 is a diagram for describing an embodiment in which the SaaS center operates as a SaaS hub platform.

The SaaS center communicates with the tenant through the connection channel and forms the connection channel with even the SaaS provider, and may serve as a hub that transfers the service from the SaaS provider to the tenant. That is, the SaaS center may be applied to even a model that is positioned between the SaaS provider and the tenant to serve as a broker.

In FIG. 7, first and second SaaS providers are service providers that safely provide a SaaS service through the security channel and first and second tenants receive various services.

Referring to FIG. 7, the SaaS center deploys the security service connector package to the first and second SaaS providers and forms the security channel through execution of the service connector package. Further, the SaaS center deploys the security service connector package to the first and second tenants and forms the security channel through execution of the security service connector package. Herein, the security channel as a channel formed between both ends, such as an IPSec VPN Tunnel may provide a very stable security service. The security service connector package deployed to the first and second SaaS providers may have a component illustrated in FIG. 4C.

In the embodiment of FIG. 7, the SaaS center positioned at the center enables safe data communication between the first and second SaaS providers and the first and second tenants through the security channel to thereby solve a concern about a network security and provide a higher-quality cloud service to the first and second tenants.

According to the embodiments of the present invention, the SaaS center adds an application to improve the quality of the cloud service to the service connector package to automatically deploy the service connector package to the tenant or the SaaS provider and allows the files and the VM image of the service connector package to be automatically executed to provide various services including the security service, a WAN acceleration service, and the like.

FIG. 8 is a flowchart for describing a method for deploying a VM of a SaaS center according to an embodiment of the present invention.

A multi-tenant connector manager, a first connector server, and a second connector server illustrated in FIG. 8 may be the multi-tenant connector manager 120, the first connector server 130, and the second connector server 210 described with reference to FIG. 1, respectively.

Referring to FIG. 8, when an automatic deployment command of the service connector package is input from the manager of the SaaS center, the multi-tenant connector manager creates the SaaS center service connector package (S805). The SaaS center service connector package includes the SaaS center VM image, the SaaS center VM loader program, and the SaaS center application loader program. Further, the multi-tenant connector manager creates the tenant service connector package corresponding to the SaaS center service connector package, that is, for the same service (S810). The tenant service connector package includes the tenant VM image, the tenant VM loader program, and the tenant application loader program.

The multi-tenant connector manager deploys the SaaS center service connector package created in step S805 to the first connector server (S815) and deploys the tenant service connector package created in step S810 to the second connector server (S820).

The SaaS center service connector package that reaches the first connector server is automatically or manually executed. That is, while the SaaS center VM loader program in the SaaS center service connector package is executed, the SaaS center VM loader program loads the SaaS center VM image (S825).

By step S825, the SaaS center VM image is instanced, and as a result, the SaaS center VM is activated (S830).

After step S830, when the SaaS center application loader program is executed (S835) and the tenant VM is also activated, the connection channel is formed between the SaaS center VM and the tenant VM or between the first connector server and the second connector server (S860).

While steps S825 to S830 are operated, steps S840 to S855 may be operated in the second connector server.

That is, while the tenant VM loader program in the tenant service connector package that reaches the second connector server is executed, the tenant VM image is loaded (S840).

By step S840, the tenant VM image is instanced, and as a result, the tenant VM is activated (S845).

After step S845, when the SaaS center VM is also activated (S830) and the SaaS center application loader program and the tenant application loader program are executed (S850), the connection channel is formed between the SaaS center VM and the tenant VM (S860). The connection channel is used when the SaaS center provides the service to the tenant VM through the SaaS center VM or manages a state of the tenant.

When the connection channel is formed, the second connector server transmits a heartbeat to the multi-tenant connector manager (S865). The heartbeat is a beat that notifies that the tenant normally operates.

The multi-tenant connector manager verifies that the tenant is alive through the heartbeat, and as a result, the first connector server and the second connector server substantially set a connection for a security or another specific service through the connection channel (S870).

The first connector server provides the service to the second connector server through the connection channel (S875).

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A multi-tenant software as a service (SaaS) platform for automatic deployment of a connector application, the platform comprising:

a multi-tenant connector manager comprising a hardware processor configured to automatically deploy a tenant service connector package to a tenant among a plurality of tenants and a SaaS platform service connector package to a connector server for activating a virtual machine of the SaaS platform to provide a service, the tenant service connector package being a package configured to cause a tenant virtual machine to be created and activated in order to provide the service to at least one tenant among the plurality of tenants in a virtual machine form; and a connector server comprising a hardware processor configured to form a connection channel between the activated tenant virtual machine and the activated virtual machine of the SaaS platform when the tenant virtual machine is activated as a result of the tenant service connector package being executed in the tenant among the plurality of tenants, wherein the service is provided between the SaaS platform and the at least one tenant through the formed connection channel.

2. The platform of claim 1, wherein the connector server comprises:
a hypervisor machine configured to operate the virtual machine of the SaaS platform.

3. The platform of claim 1, wherein the multi-tenant connector manager comprises:
a virtual machine instance manager configured to create the tenant service connector package by combining a virtual machine image for the service and set-up files for executing the virtual machine image; and
a deployment unit configured to deploy the created tenant service connector package to the tenant.

4. The platform of claim 3, wherein the multi-tenant connector manager further comprises:
a virtual machine image manager configured to read a first program from among the set-up files, for loading the virtual machine image, and the virtual machine image from a storage medium, and to transfer the first program and virtual machine image to the virtual machine instance manager, according to a request by the virtual machine instance manager; and
an application manager configured to read a second program from among the set-up files for loading an application associated with the service from the storage medium, and to transfer the second program to the virtual machine instance manager, according to the request by the virtual machine instance manager.

5. The platform of claim 3, wherein the tenant comprises:
a hardware processor;
the tenant virtual machine configured to be activated by the set-up files in the tenant service connector package received from the multi-tenant connector manager by the hardware processor, the set-up files corresponding to the virtual machine image; and
a hypervisor machine configured to operate the tenant virtual machine by the hardware processor.

6. The platform of claim 5, wherein in the tenant, a first program from among the set-up files for loading the virtual machine image is executed, and as a result, the tenant virtual machine is activated and a second program from among the set-up files for loading the application associated with the service is executed, and as a result, the connection channel is formed.

7. The platform of claim 1, wherein the multi-tenant connector manager is configured to deploy a plurality of tenant service connector packages to the tenant to facilitate high availability of the service.

8. The platform of claim 1, wherein the multi-tenant connector manager is configured to automatically deploy a service provider service connector package to a service provider among a plurality of service providers, the service provider service connector package being a package configured to cause a service provider virtual machine to be created in order to provide a service to at least one service provider among the plurality of service providers in the virtual machine form, and
when the service provider service connector package is deployed to the service provider, the connector server is configured to serve as a hub that transfers the service from the service provider to the at least one tenant.

9. A method for automatic deployment of a connector application in a multi-tenant software as a service (SaaS) platform, the method comprising:
deploying a tenant service connector package to a tenant among a plurality of tenants and a SaaS platform service connector package to a connector server for activating a virtual machine of the SaaS platform to provide a service, the tenant service connector package being a package configured to cause a tenant virtual machine to be created and activated in order to provide the service to at least one tenant of the plurality of tenants in a virtual machine form;
activating the tenant virtual machine through execution of the tenant service connector package in the tenant that receives the tenant service connector package;
forming a connection channel between the activated virtual machine of the SaaS platform and the activated tenant virtual machine; and
providing the service between the SaaS platform and the at least one tenant through the formed connection channel.

10. The method of claim 9, further comprising:
creating the SaaS platform service connector package, the SaaS platform service connector package comprising set-up files for creating the virtual machine of the SaaS platform for being connected with the tenant virtual machine and for executing a virtual machine image of the SaaS platform, and a virtual machine image of the SaaS platform for the service, and
activating the virtual machine of the SaaS platform through execution of the created SaaS platform service connector package.

11. The method of claim 10, further comprising:
creating the tenant service connector package by using the virtual machine image for the service and the set-up files for executing the virtual machine image when an automatic deployment command of the tenant service connector package is inputted via the SaaS platform.

12. The method of claim 11, wherein in activating the tenant virtual machine, the set-up files are configured to be executed and the tenant virtual machine corresponding to the virtual machine image is configured to be activated in the tenant that receives the tenant service connector package.

13. The method of claim 11, wherein in activating the tenant virtual machine, a first program from among the set-up files for loading the virtual machine image is configured to be executed, and as a result, the tenant virtual machine is configured to be activated in the tenant, and
in forming a connection channel, a second program from among the set-up files for loading an application associated with the service is configured to be executed, and as a result, the connection channel is formed.

14. The method of claim 9, wherein in deploying a tenant service connector package, a plurality of tenant service connector packages are deployed to the tenant to facilitate high availability of the service.

15. The method of claim 9, further comprising:
creating a service provider service connector package, the service provider service connector package being a package configured to cause a service provider virtual machine to be created in order to provide a service to at least one service provider among a plurality of service providers in the virtual machine form, and
automatically deploying the created service provider service connector package to the at least one service provider,
wherein when the service provider service connector package is deployed to the service provider, the connector server is configured to serve as a hub that transfers the service from the service provider to at least one tenant.

* * * * *